(12) United States Patent
Havell et al.

(10) Patent No.: US 10,983,814 B2
(45) Date of Patent: Apr. 20, 2021

(54) SYSTEMS AND METHODS FOR PROVIDING LANGUAGE SELECTION TECHNOLOGY THROUGH INTERFACE WITH CINEMA SERVERS

(71) Applicant: Theatre FX, LLC, Murray, UT (US)

(72) Inventors: David J. Havell, Salt Lake City, UT (US); Ken Barton, Sandy, UT (US); Aaron Best, Murray, UT (US); Alex Ferro, West Jordan, UT (US); Tim Hayford, Salt Lake City, UT (US)

( * ) Notice: Subject to any disclaimer, the term of this patent is extended or adjusted under 35 U.S.C. 154(b) by 229 days.

(21) Appl. No.: 15/924,042

(22) Filed: Mar. 16, 2018

(65) Prior Publication Data

US 2018/0285133 A1 Oct. 4, 2018

Related U.S. Application Data

(60) Provisional application No. 62/478,488, filed on Mar. 29, 2017.

(51) Int. Cl.
| | |
|---|---|
| *G06F 9/451* | (2018.01) |
| *G06F 3/16* | (2006.01) |
| *G06F 3/0488* | (2013.01) |
| *G06F 3/0482* | (2013.01) |

(52) U.S. Cl.
CPC ............ *G06F 9/454* (2018.02); *G06F 3/0482* (2013.01); *G06F 3/04883* (2013.01); *G06F 3/165* (2013.01)

(58) Field of Classification Search
CPC .... G06F 9/454; G06F 3/0482; G06F 3/04883; G06F 3/165

USPC .......................................................... 715/703
See application file for complete search history.

(56) References Cited

U.S. PATENT DOCUMENTS

| | | | | |
|---|---|---|---|---|
| 4,389,679 A | * | 6/1983 | Missan et al. ........... | G09B 5/04 360/12 |
| 7,114,171 B2 | * | 9/2006 | Brady, Jr. ............... | H04L 29/06 348/E7.086 |
| 2004/0027496 A1 | * | 2/2004 | Morales ................. | G03B 31/04 348/745 |

(Continued)

FOREIGN PATENT DOCUMENTS

CA          2350247 A1 *  2/2002  ........... H04R 1/1091

*Primary Examiner* — Stephen S Hong
*Assistant Examiner* — Broderick C Anderson
(74) *Attorney, Agent, or Firm* — Michael F. Krieger; Kirton McConkie

(57) ABSTRACT

Embodiments of this invention relate to theater seating, and more particularly to theater seating comprising a user interface that can be used to control various elements of the seat, and allow the user to select the language in which media is presented (i.e., systems and methods for providing language selection technology through interface with cinema servers). Embodiments of this system comprise a touchscreen user interface, a processing and IO circuit board, and a head phone audio jack. In some embodiments the touchscreen user interface comprises a menu selectable device. In some embodiments the menus show various controllable features selected from a list comprising: multiple language outputs with volume controls, position control for the seat back recline and foot elevation, potentially a seat temperature control with heat and cooling, and even potentially a customer rewards number input device capable of theater concessions ordering.

20 Claims, 7 Drawing Sheets

(56) References Cited

U.S. PATENT DOCUMENTS

2010/0176632 A1* 7/2010 Alford ............... B64D 11/0624
297/217.3
2017/0034638 A1* 2/2017 Anastas ................ H04R 5/033
2019/0020923 A1* 1/2019 Joye ................ H04N 21/42201

* cited by examiner

SYSTEMS AND METHODS FOR PROVIDING LANGUAGE SELECTION TECHNOLOGY THROUGH INTERFACE WITH CINEMA SERVERS

CROSS-REFERENCE TO RELATED APPLICATIONS

This application claims priority to U.S. Provisional Patent Application Ser. No. 62/478,488 which was filed Mar. 29, 2017.

BACKGROUND

1. Field of the Invention

This invention relates to theater seating, and more particularly to theater seating comprising a user interface that can be used to control various elements of the seat, and allow the user to select the language in which media is presented.

2. Related Art

One way in which the passive entertainment industry has been enhanced has been through the incorporation of channels utilized by theaters to provide the hearing impaired and visually impaired with differential audio streams that play simultaneously to certain individuals over headphones in the theater.

Not only must the audio be specifically programmed for each feature, but the programmed audio must be carefully synchronized with the movie or the audio will detract from the experience rather than adding to it. Therefore, many systems rely on programming that is performed by the movie studio and is thus part of, for example, the movie reel. The advent of all-digital movie projection systems may reduce the synchronization concern somewhat, but the fact remains that given the expense and difficulty of programming each movie, such programming is performed for relatively few movies. Therefore, the expensive motion features incorporated into the theater seating often go unused.

Given the costs and technological difficulties associated with expanding the range of services offered by theaters for individuals in the theater have been dramatically limited.

BRIEF SUMMARY

Embodiments of this invention relate to theater seating, and more particularly to theater seating comprising a user interface that can be used to control various elements of the seat, and allow the user to select the language in which media is presented (i.e., systems and methods for providing language selection technology through interface with cinema servers).

Embodiments of this system comprise a touchscreen user interface, a processing and IO circuit board, and a head phone audio jack. In some embodiments the touchscreen user interface comprises a menu selectable device. In some embodiments the menus show various controllable features selected from a list comprising: multiple language outputs with volume controls, position control for the seat back recline and foot elevation, a seat temperature control with heating and cooling, and a customer rewards number input device capable of theater concessions ordering.

In some embodiments the touchscreen user interface displays a series of user selectable visual menus displayed on the touchscreen. According to some embodiments, one set of menus may give user control over the seat hardware such as seat positions and seat temperature. Another menu may give the user the ability to select the language and volume of the movie sound track routed to the headphone jack, or other communications that will be output to the headphone jack, in accordance with various embodiments of the invention. In other embodiments another menu may be to log into the theater concession, using the customer rewards number, and order food and services. The touchscreen user interface device is able to communicate to the local or other standard Ethernet network. The touchscreen user interface is capable of displaying both still pictures and video. Other user recognition features such as fingerprint, voice or face may be incorporated to recognize the user.

In some embodiments the touchscreen user interface is a networked device connecting it the intranet by standard Ethernet interface. In some embodiments, the touchscreen user interface is essentially a highly customizable control interface to the recliner and to anything else a theater chooses to expose on the network; concessions is one example. In some embodiments, each theater may create their own look and program that look into their systems over the network. In some embodiments the display feature along with its intranet connection allows several "webpages" that the theater can create and push down to the touchscreen user interface. Theaters may customize the interface and add functionality via the webpage.

In some embodiments because the touchscreen user interface is networked, it has the ability to send and receive data to/from a server or even another touchscreen user interface on the network. In some embodiments each touchscreen includes an on-board Ethernet switch, so the connection may be daisy chained. In some embodiments, because the touchscreen user interface is connected with the Ethernet every touchscreen user interface device is simultaneously available on the network and can take advantage of the Ethernet message format known as multicast. Multicast messages are essentially flooded to all points on the network. In this way each touchscreen user interface device receives a multicast message at effectively the same time.

In some embodiments regarding the movie theater itself, every movie is shipped with 3 audio tracks; the language track (this is the voice track that you hear over the speakers), descriptive track (for vision impaired), and hearing impaired track (which is just the language track). These audio tracks are run simultaneously with the video and are routed out to what is known as the cinema processor. This processor takes in all the audio tracks and breaks them up into the various channels (left, right, center, sub, surround, etc.). The three 'language' tracks exist on specific channels. (e.g., Hearing impaired is on channel 7 and visual impaired on channel 8).

According to some embodiments the system is capable of utilizing those channels either before or after they enter the cinema processor and route them to a multicast translator. In some embodiments a studio mixes in a different language, or two on some of the unused channels. According to some embodiments, the system appropriates the audio off those channels, routes them to a multicast translator, and then out to the touchscreen user interface network.

For example, Blu-ray discs come with multiple languages, and those tracks are currently available. The computer is required to stream all the languages over the touchscreen user interface network. Since modern projectors (or Cinema Servers) are computers, there is no technical barrier to doing essentially the same thing in commercial theater settings.

Embodiments of the invention comprise the use of proprietary software to handle these multiple tracks, or channels. In some embodiments the transport method is standard Ethernet multicast. Some embodiments use standard embedded Linux OS as the platform, but the programming to pull out the data and tie it to the language button on the screen is proprietary software created by the client. Similarly, all the controls and functionality of the touchscreen user interface were created by Applicant.

According to some embodiments of the invention, each of the language output signals is directed to a different seat such as a theater seat. Each of the language assemblies is located within the user interface of each seat such that as a specified language is demanded and driven by each of the output signals, different languages are heard are various different seats at different locations of the theater.

The generated output signals and the corresponding language may be highly customizable to respond to varying individuals and/or movie theater needs. The system may also be highly scalable to permit control of language of any number of seats from a single seat to as many seats may be desired.

BRIEF DESCRIPTION OF THE DRAWINGS

The specific features, aspects and advantages of the present invention will become better understood with regard to the following description and accompanying drawings where.

DETAILED DESCRIPTION

Figure 1:
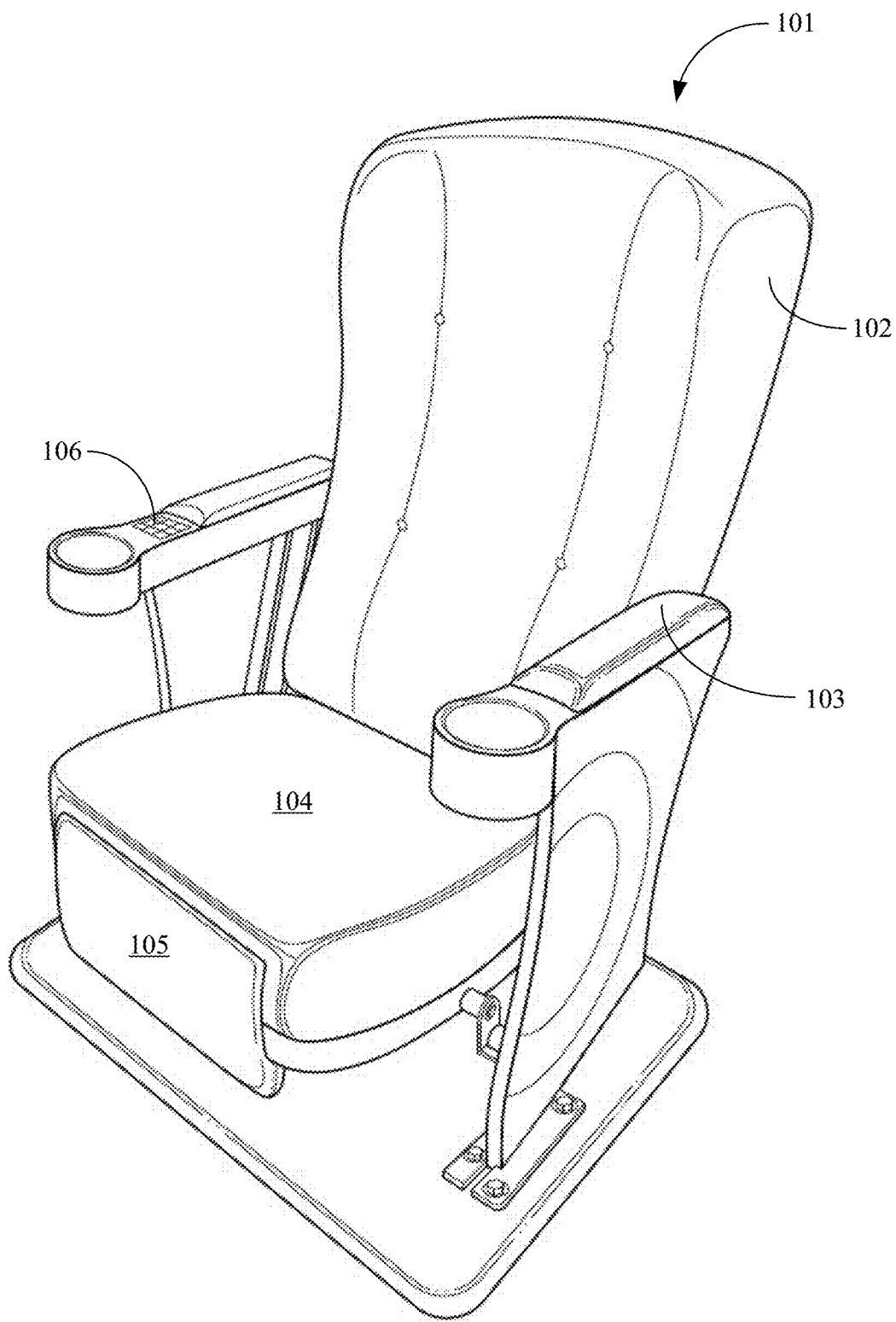
FIG. 1 shows a perspective view of a representative theater seat on a closed position.

Embodiments of this invention relate to theater seating, and more particularly to theater seating comprising a user interface that can be used to control various elements of the seat, and allow the user to select the language in which media is presented (i.e., systems and methods for providing language selection technology through interface with cinema servers).

Embodiments of this system comprise a touchscreen user interface, a processing and IO circuit board, and a headphone audio jack. In some embodiments the touchscreen user interface comprises a menu selectable device. In some embodiments the menus show various controllable features selected from a list comprising: multiple language outputs with volume controls, position control for the seat back recline and foot elevation, a seat temperature control with heating and cooling, and a customer rewards number input device capable of theater concessions ordering.

In the following description of the present invention, reference is made to the accompanying drawings, which form a part hereof, and in which is shown by way of illustration specific embodiments in which the invention may be practiced. It is understood that other embodiments may be utilized and structural changes may be made without departing from the scope of the present invention.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. RAM can also include solid state drives (SSDs or PCIx based real time memory tiered Storage, such as FusionIO). Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the invention can also be implemented in cloud computing environments. In this description and the following claims, "cloud computing" is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service (SaaS), Platform as a Service (PaaS), Infrastructure as a Service (IaaS), and deployment models (e.g., private cloud, community cloud, public cloud, hybrid cloud, etc.). Databases and servers described with respect to the present invention can be included in a cloud model.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the following description and Claims to refer to particular system components. As one skilled in the art will appreciate, components may be referred to by different names. This document does not intend to distinguish between components that differ in name, but not function.

FIG. 1 illustrates a perspective view of a reclining theater seat 101 in a closed position. In some embodiments the theater seat comprises a back rest 102, armrest(s) 103, a seat cushion 104, a leg support 105, a user interface 106, and a power supply (not illustrated). FIG. 1 illustrates the theater seat 101 in a closed position, wherein the leg support 105 is lowered allowing for individuals utilizing the seat 104 to easily sit down in the seat 104, or get up from the seat 104.

Figure 2:
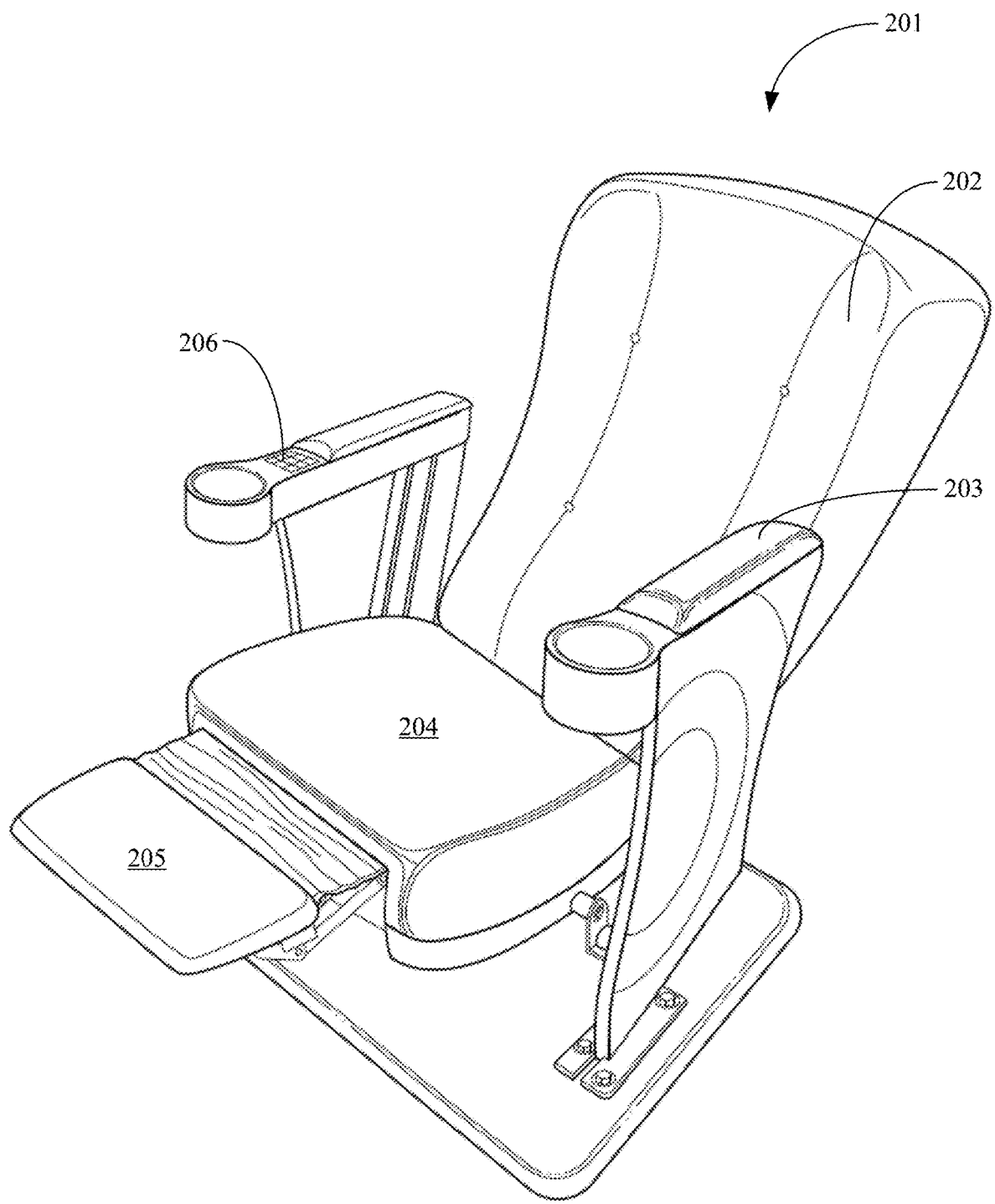
FIG. 2 shows a perspective view of a representative theater seat in an open position.

FIG. 2 illustrates a perspective view of a recliner theater seat 201 in an open position. In some embodiments the theater seat comprises a back rest 202, armrest(s) 203, a seat cushion 204, a leg support 205, a user interface 206, and a power supply (not illustrated). FIG. 2 illustrates the theater seat 201 in an open position, wherein the leg support 205 is raised to support the legs and feet of an individual utilizing seat 201.

Figure 3:
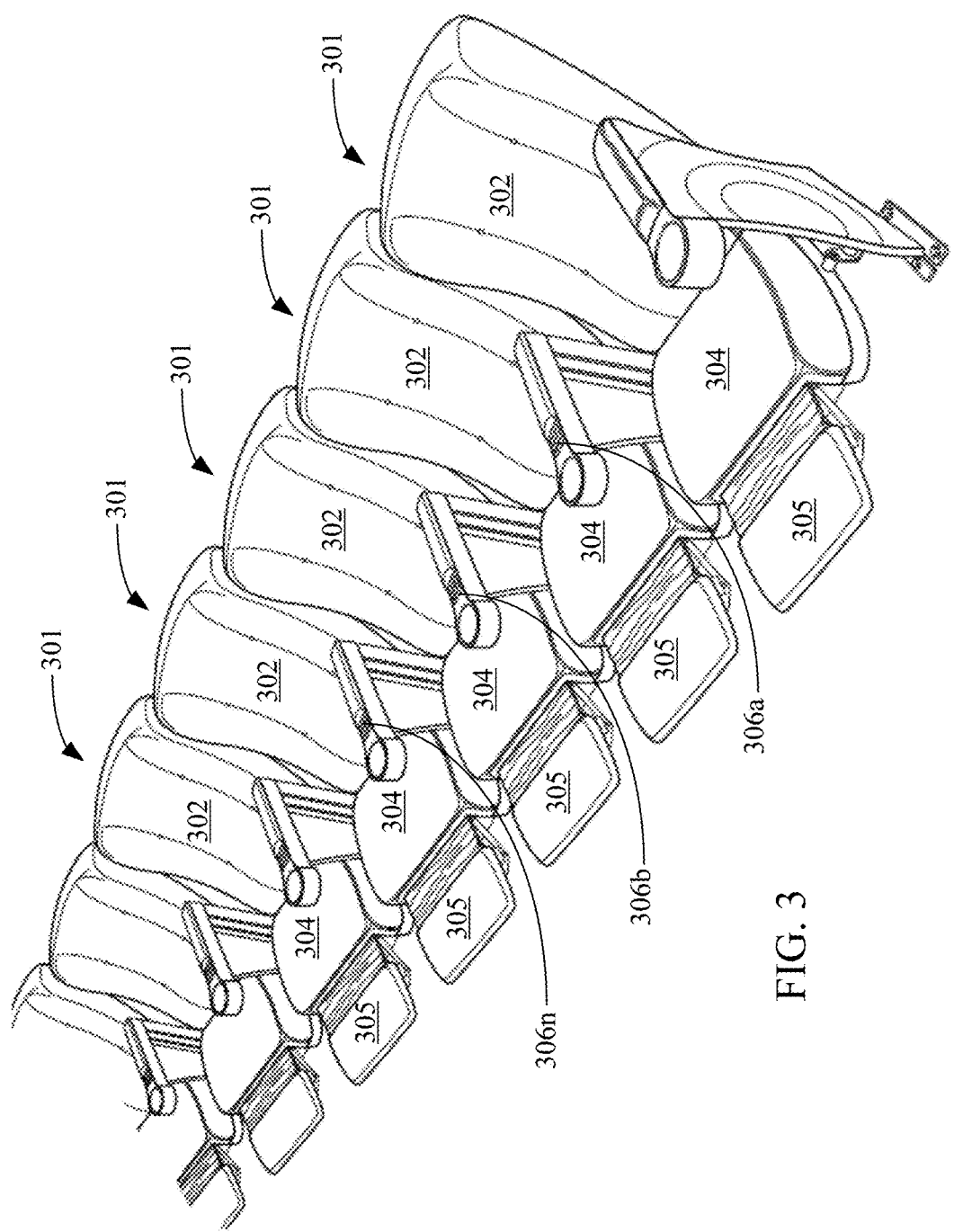
FIG. 3 shows a perspective view of a series of theater seats in an open position.

FIG. 3 illustrates a perspective view of several recliner theater seats 301 in an open position. In some embodiments the theater seats 301 may comprise a back rest 302, armrest(s) 303, a seat cushion 304, a leg support 305, a user interface 306, and a power supply (not illustrated). FIG. 3 illustrates the theater seats 301 in an open position, wherein the leg supports 305 are raised to support the legs and feet of an individual utilizing seat 301.

Figure 4:
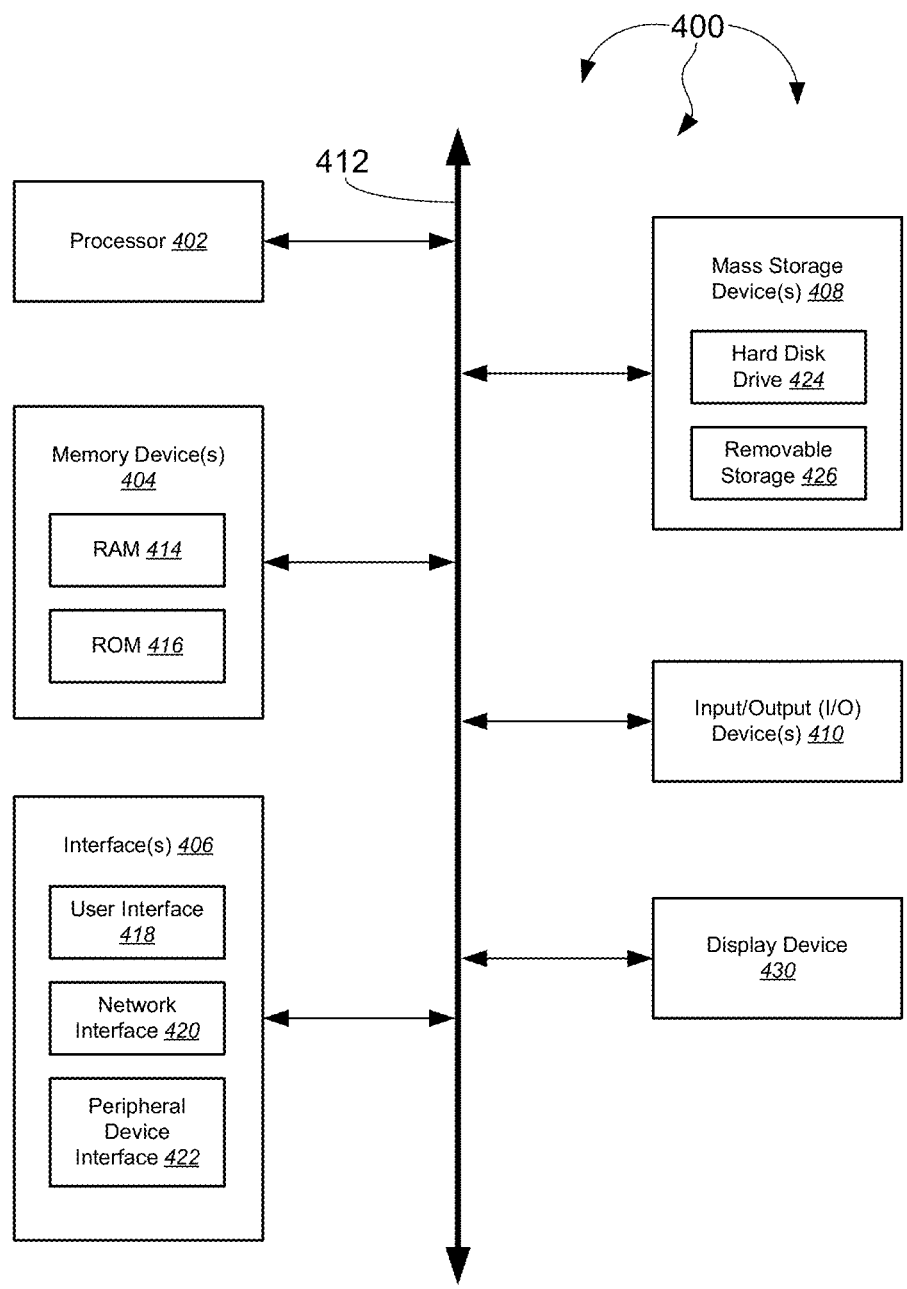
FIG. 4 shows a block diagram of a computing device.

FIG. 4 illustrates an example block diagram of a computing device 400. Computing device 400 can be used to perform various procedures, such as those discussed herein. Computing device 400 can function as a server, a client, or any other computing entity. Computing device 400 can perform various communication and data transfer functions as described herein and can execute one or more application programs, such as the application programs described herein. Computing device 400 can be any of a wide variety of computing devices, such as a mobile telephone or other mobile device, a desktop computer, a notebook computer, a server computer, a handheld computer, tablet computer, a touch screen user interface 600 and the like.

Computing device 400 includes one or more processor(s) 402, one or more memory device(s) 404, one or more interface(s) 406, one or more mass storage device(s) 408, one or more Input/Output (I/O) device(s) 410, and a display device 430 all of which are coupled to a bus 412. Processor(s) 402 includes one or more processors or controllers that execute instructions stored in memory device(s) 404 and/or mass storage device(s) 408. Processor(s) 402 may also include various types of computer storage media, such as cache memory.

Memory device(s) 404 includes various computer storage media, such as volatile memory (e.g., random access memory (RAM) 414) and/or nonvolatile memory (e.g., read-only memory (ROM) 416). Memory device(s) 404 may also include rewritable ROM, such as Flash memory.

Mass storage device(s) 408 includes various computer storage media, such as magnetic tapes, magnetic disks, optical disks, solid state memory (e.g., Flash memory), and so forth. As depicted in FIG. 4, a particular mass storage device is a hard disk drive 424. Various drives may also be included in mass storage device(s) 408 to enable reading from and/or writing to the various computer readable media. Mass storage device(s) 408 include removable media 426 and/or non-removable media.

I/O device(s) 410 include various devices that allow data and/or other information to be input to or retrieved from computing device 400. Example I/O device(s) 410 include cursor control devices, keyboards, keypads, barcode scanners, microphones, monitors or other display devices, speakers, printers, network interface cards, modems, cameras, lenses, CCDs or other image capture devices, and the like.

Display device 430 includes any type of device capable of displaying information to one or more users of computing device 400. Examples of display device 430 include a monitor, display terminal, video projection device, and the like.

Interface(s) 406 include various interfaces that allow computing device 400 to interact with other systems, devices, or computing environments as well as humans. Example interface(s) 406 can include any number of different network interfaces 420, such as interfaces to personal area networks (PANs), local area networks (LANs), wide area networks (WANs), wireless networks (e.g., near field communication (NFC), Bluetooth, Wi-Fi, etc., networks), and the Internet. Other interfaces include user interface 418 and peripheral device interface 422.

Bus 412 allows processor(s) 402, memory device(s) 404, interface(s) 406, mass storage device(s) 408, and I/O device(s) 410 to communicate with one another, as well as other devices or components coupled to bus 412. Bus 412 represents one or more of several types of bus structures, such as a system bus, PCI bus, IEEE 4394 bus, USB bus, and so forth.

Figure 5:
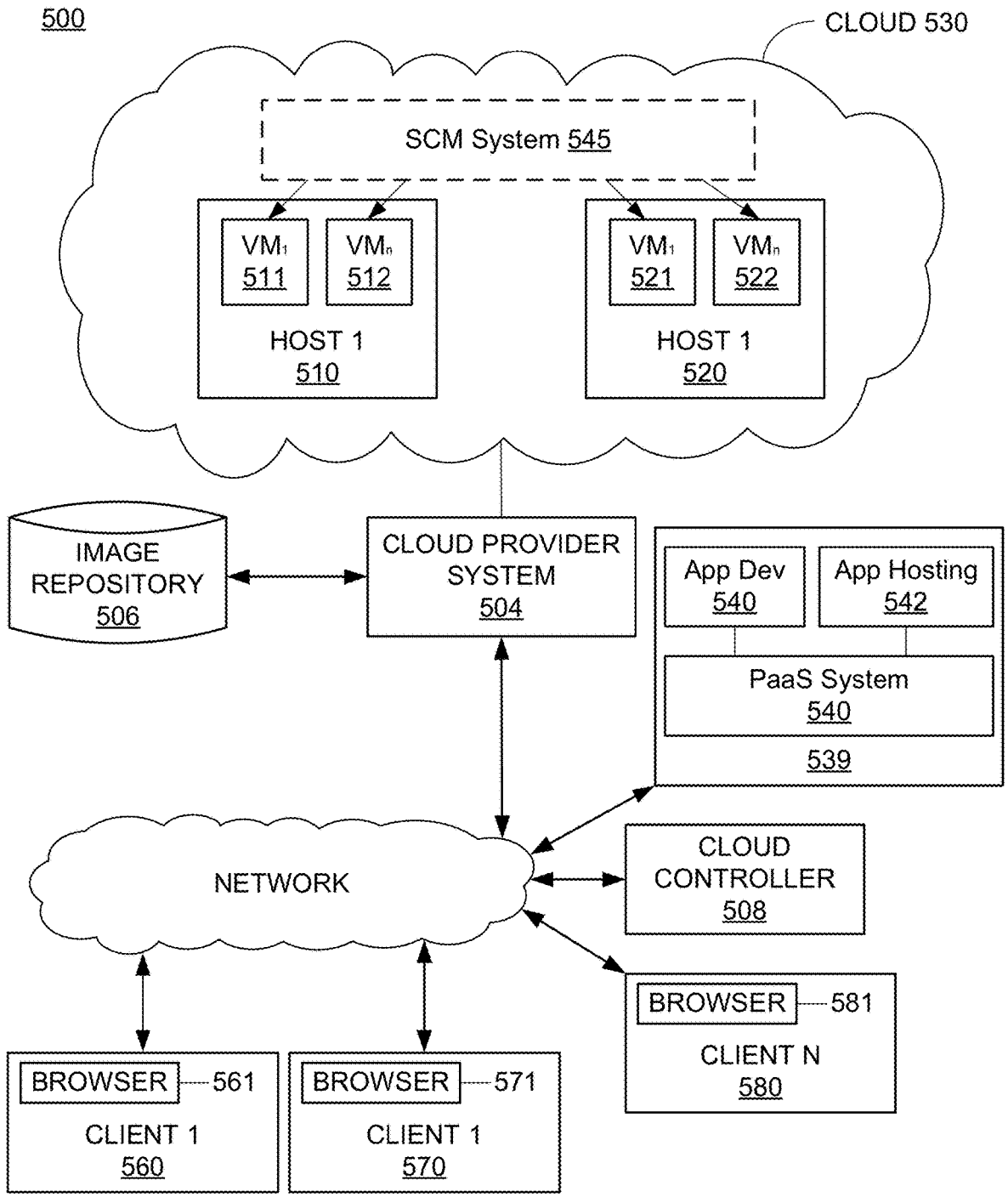
FIG. 5 shows an example computer architecture that facilitates PaaS environment for developing, supporting, and hosting applications.

FIG. 5 is a block diagram of a network architecture 500 in which embodiments of the disclosure may operate. The network architecture 500 includes a cloud 530 managed by a cloud provider system 504. The cloud provider system 504 provides VMs, such as VMs 511, 512, 521, and 522 hosted in cloud 530. Each VM is hosted on a physical machine, which may comprise some or all of the physical elements described in FIG. 1, such as host 1 510 through host N 520, configured as part of the cloud 530. In some embodiments, the host machines 510, 520 are often located in a data center. For example, VMs 511 and 512 are hosted on physical machine 510 in cloud 530 provided by cloud provider 504. Users can interact with applications executing on the cloud-based VMs 511, 512, 521, 522 using client computer systems, such as clients 560, 570 and 580, via corresponding web browser applications 561, 571 and 581.

Clients 560, 570 and 580 are connected to hosts 510, 520 and the cloud provider system 504 via a network 502, which may be a private network (e.g., a local area network (LAN), a wide area network (WAN), intranet, or other similar private networks) or a public network (e.g., the Internet). Each client 560, 570, 580 may be a mobile device, a PDA, a laptop, a desktop computer, or any other computing device. Each host 510, 520 may be a server computer system, a desktop computer or any other computing device. The cloud provider system 504 may include one or more machines such as server computers, desktop computers, etc.

In one embodiment, the cloud provider system 504 is coupled to a cloud controller 508 via the network 502. The cloud controller 508 may reside on one or more machines (e.g., server computers, desktop computers, etc.) and may manage the execution of applications in the cloud 530. In some embodiments, cloud controller 508 receives commands from PaaS provider controller 540. Based on these commands, the cloud controller 508 provides data (e.g., such as pre-generated images) associated with different applications to the cloud provider system 504. In some embodiments, the data may be provided to the cloud provider 504 and stored in an image repository 506, in an image repository (not shown) located on each host 510, 520, or in an image repository (not shown) located on each VM 511, 512, 521, 522.

In one embodiment, each VM 511, 512, 521, 522 running applications for the PaaS provider controller 540 includes a source code management (SCM) system 545, sometimes referred to as "SCM" or revision control system. One example of such an SCM or revision control system is Git, available as open source software. Git, and other such distributed SCM systems, usually include a working directory for making changes, and a local software repository for storing the changes. The packaged software application can then be "pushed" from the local Git repository to a remote Git repository. SCM system 545 on VMs 511, 512, 521, 522 stores the remote repositories for each application running on the VM 511, 512, 521, 522, so that the application code may be edited by others with access, or the application may be executed by the VM 511, 512, 521, 522.

While various embodiments are described in terms of the environment described above, those skilled in the art will appreciate that the facility may be implemented in a variety of other environments including a single, monolithic computer system, as well as various other combinations of computer systems or similar devices connected in various ways. For example, the data from the image repository 506 may run directly on a physical host 510, 520 instead of being instantiated on a VM 511, 512, 521, 522.

FIG. 5 illustrates an example computer architecture 500 that facilitates allowing applications of the present system to be developed, maintained and supported on a PaaS system 540. Referring to FIG. 5, computer architecture 500 includes PaaS provider server system 539 comprising PaaS server system 540, application development system 541, application hosting system 542, and client systems 560, 570, 580. Provider server system 539 and client systems 560, 570, 580 can comprise any type and number of computing components or devices. For example, provider server system 539 can represent a number of interconnected computing components forming a cloud. Also, client systems 560, 570, 580 can represent a desktop computer, laptop computer, smart phone, touchscreen user interfaces, etc.

Each of the depicted systems can be connected to one another over (or be part of) a network 402, such as, for example, a PAN, a LAN, a WAN, and even the Internet. Accordingly, each of the depicted devices and computer systems as well as any other connected computer systems and their components, can create message related data and exchange message related data (e.g., near field communication ("NFC") payloads, Bluetooth packets, Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Server system 539 provides a PaaS application development and hosting system 540, 541, 542 that can be accessed by client systems 560, 570, 580. The PaaS application development and hosting system 540, 541, 542 can include one or more services. In some embodiments, PaaS application development and hosting 540 includes an application development system 541 and an application hosting system 542.

Client systems 560, 570, 580 may provide a touchscreen user interface 561, 571, 581 allowing developers to login to provider's server system 539 accessing application development system 541 to create a new application designed for client systems 560, 570, 580 or third party end-user systems. Generally, server system 539 allows developers to create the various modules required to provide client systems 560, 570, 580 or third party end-user systems with a fully functional application hosted by provider on the server system 539.

Figure 6:
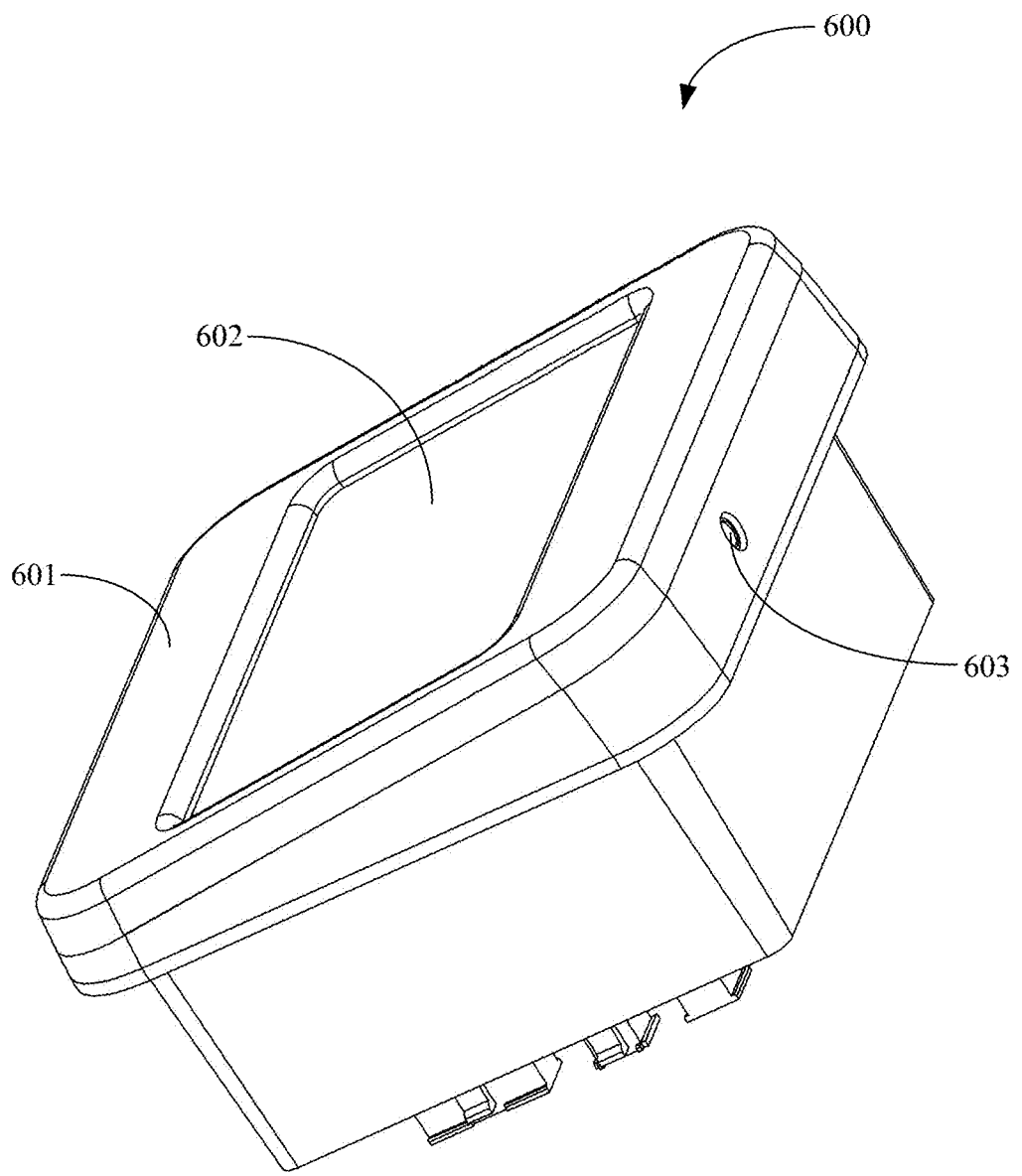
FIG. 6 shows a perspective view of the user interface located on the armrest of each of the theater seats.

FIG. 6 illustrates a touch screen user interface 600 according to some embodiments of the invention. As depicted in FIG. 6 the touch screen user interface 600 comprises a housing 601, a touch screen display 602, and a headphone jack 603. In some embodiments the touchscreen user interface displays a series of user selectable visual menus displayed on the touchscreen. According to some embodiments, one set of menus may give user control over the seat hardware such as seat positions and seat temperature. Another menu may give the user the ability to select the language and volume of the movie sound track routed to the headphone jack, or other communications that will be output to the headphone jack, in accordance with various embodiments of the invention. In other embodiments another menu may be to log into the theater concession, using the customer rewards number, and order food and services. The touchscreen user interface device is able to communicate to the local or other standard Ethernet network. The touchscreen user interface is capable of displaying both still pictures and video. Other user recognition features such as fingerprint, voice or face may be incorporated to recognize the user.

In some embodiments the touchscreen user interface is a networked device connecting it to the intranet by a standard Ethernet interface. In some embodiments, the touchscreen user interface is essentially a highly customizable control interface to the recliner and to anything else a theater chooses to expose on the network; concessions is one example. In some embodiments, each theater may create their own look and program that look into their systems over the network. In some embodiments the display feature along with its intranet connection allows several "web pages" that the theater can create and push down to the touchscreen user interface. They can't change the low level programming, but they can customize the interface and add functionality via the webpage idea.

In some embodiments because the touchscreen user interface is networked, it has the ability to send and receive data to/from a server or even another touchscreen user interface on the network. In some embodiments each touchscreen user interface includes an on-board Ethernet switch, so you can daisy chain the connection. In some embodiments, because the touchscreen user interface is connected with the Ethernet every touchscreen user interface device is simultaneously available on the network and can take advantage of the Ethernet message format known as multicast. Multicast messages are essentially flooded to all points on the network. In this way each touchscreen user interface device receives a multicast message at effectively the same time.

Figure 7:
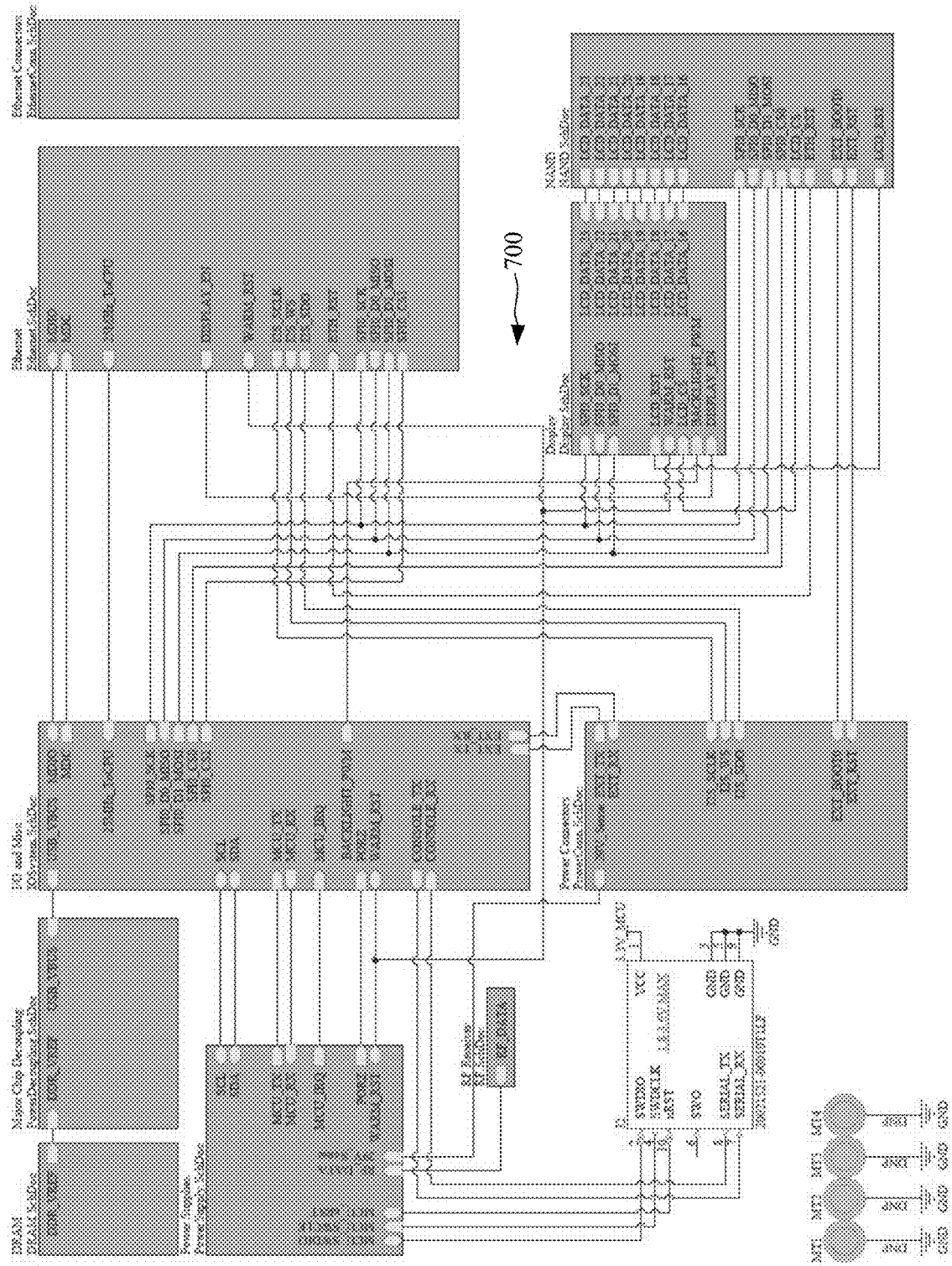
FIG. 7 shows a top level schematic detailing interactions with the present invention, theater inputs and the output for each seat.

FIG. 7 illustrates a top level schematic of embodiments of the system. In some embodiments regarding the movie theater itself, every movie is shipped with 3 audio tracks; the language track (this is the voice track that you hear over the speakers), descriptive track (for vision impaired), and hearing impaired track (which is just the language track). These audio tracks are run simultaneously with the video and are routed out to what is known as the Cinema Processor. This processor takes in all the audio tracks and breaks them up into the various channels (left, right, center, sub, surround, etc.). The 3 'language' tracks exist on specific channels. (Hearing impaired is on channel 7 and visual impaired on channel 8).

According to some embodiments the system is capable of utilizing those channels either before or after they enter the cinema processor and route them to a multicast translator. In some embodiments a studio mixes in a different language, or two on some of the unused channels. According to some embodiments, the system appropriates the audio off those channels, route them to a multicast translator, and then out to the touchscreen user interface network.

For example, Blu-ray discs come with multiple languages, and those tracks are currently available. The computer is required to stream all the languages over the touchscreen user interface network. Since modern projectors (or Cinema Servers) are computers, there is no technical barrier to doing essentially the same thing in commercial theater settings.

Embodiments of the invention comprise the use of proprietary software to handle these multiple tracks, or channels. In some embodiments the transport method is standard Ethernet multicast. Some embodiments use standard embedded Linux OS as the platform, but the programming to pull out the data and tie it to the language button on the screen is proprietary software created by the client. Similarly, all the controls and functionality of the touchscreen user interface were created by Applicant.

According to some embodiments of the invention, each of the language output signals is directed to a different seat such as a theater seat. Each of the language assemblies is located within the user interface of each seat such that as a specified language is demanded and driven by each of the output signals, different languages are heard are various different seats at different locations of the theater. This ability to select a language of choice enhances the motion experience over existing motion systems that rely on a single audio track being listened to by each individual in the theater.

The generated output signals and the corresponding language may be highly customizable to respond to varying individuals and/or movie theater needs. The system may also be highly scalable to permit control of language of any number of seats from a single seat to as many seats may be desired.

While some embodiments of the invention have been discussed with respect to theater seating and home theater seating, embodiments of the invention are not limited to such applications. Embodiments of the invention may be utilized with essentially any kind of seating where language selection and control of a theater seat may be provided in conjunction with delivery of any media type having an audio component. Therefore, embodiments of the invention may be utilized in automotive settings as well as essentially any stationary or mobile type of seating.

The foregoing examples are merely examples of potential areas of applicability of certain embodiments of the invention, and other areas of applicability will be understood by way of practicing the embodiments of the invention.

The present invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within their scope.

What is claimed:

1. A system for providing a language-enhanced experience for consumption of media containing audio information, the system comprising:
    a seat comprising:
        a touchscreen user interface comprising a touchscreen display having a language selection input; and
        a headphone jack; and
    a signal processor module at the seat and communicatively connected to the touchscreen user interface, the signal processor module being configured to receive audio information from an audio source comprising a plurality of different-language audio signals corresponding to a single video signal and to process the audio information into a plurality of output signals, each output signal comprising individual and distinct language signal information corresponding to the video signal and processed by the signal processor module to drive an output operatively connected to the headphone jack and comprising a language selected by a user utilizing the language selection input of the touchscreen user interface;
    wherein the touchscreen user interface of one seat is configured to control a language output of headphone jacks of a plurality of other seats.

2. The system as recited in claim 1, wherein the touchscreen user interface is integrated into an armrest of the seat.

3. The system as recited in claim 1, wherein the touchscreen user interface comprises a housing containing the touchscreen display and the headphone jack.

4. The system as recited in claim 1, wherein the touchscreen user interface comprises a housing containing the touchscreen display and the headphone jack and is integrated with an armrest of the seat.

5. The system as recited in claim 1, wherein the seat further comprises a motion system.

6. The system as recited in claim 1, wherein the system further comprises a language assembly at the touchscreen user interface that is configured to receive the plurality of output signals and output the language selected by the user.

7. The system as recited in claim 1, wherein the seat is a theater seat in a movie theater.

8. The system as recited in claim 1, wherein the system comprises an Ethernet switch at the seat adapted to permit daisy-chaining an audio connection of multiple seats together.

9. A method for utilizing a highly customizable control interface to a recliner comprising:
utilizing a touchscreen user interface comprising a touchscreen display:
displaying a menu on the touchscreen display with controls comprising the selection of a language in which an audio portion of audiovisual media will be heard at a headphone jack of a theater seat;
broadcasting menu selections via at least one of the internet and the intranet;
receiving audio information by multicast at the touchscreen user interface, the audio information containing a first range of frequencies corresponding to a plurality of different-language audio tracks for the audiovisual media; and
utilizing headphones connected to the headphone jack to listen to an audio feed from the audiovisual media in the selected language;
wherein the touchscreen user interface of one recliner is configured to control a language output of headphone jacks of a plurality of other recliners.

10. The method as recited in claim 9, wherein the touchscreen user interface is integrated into an armrest of the recliner.

11. The method as recited in claim 9, wherein the touchscreen user interface comprises a housing containing the touchscreen display and the headphone jack.

12. The method as recited in claim 9, wherein the touchscreen user interface comprises a housing containing the touchscreen display and the headphone jack and is integrated with an armrest of the recliner.

13. The method as recited in claim 9, wherein the recliner further comprises a motion system.

14. The method as recited in claim 9, wherein the system further comprises a language assembly at the touchscreen user interface that is configured to receive the multicast and output the audio feed in the selected language.

15. The method as recited in claim 9, wherein the recliner is a theater recliner in a movie theater.

16. The method as recited in claim 9, wherein the system comprises an Ethernet switch at the recliner adapted to permit daisy-chaining an audio connection of multiple recliners together.

17. A system for providing a language-enhanced experience for consumption of media containing audio information, the system comprising:
a seat comprising:
a touchscreen user interface comprising a touchscreen display having a language selection input; and
a headphone jack;
a signal processor module at the seat and communicatively connected to the touchscreen user interface, the signal processor module being configured to receive audio information from an audio source comprising a plurality of different-language audio signals corresponding to a single video signal and to process the audio information into a plurality of output signals, each output signal comprising individual and distinct language signal information corresponding to the video signal and processed by the signal processor module to drive an output operatively connected to the headphone jack and comprising a language selected by a user utilizing the language selection input of the touchscreen user interface; and
a user recognition feature selected from the group consisting of a fingerprint recognition feature, a voice recognition feature, and a face recognition feature.

18. The system as recited in claim 17, wherein the touchscreen user interface of one seat is configured to control a language output of headphone jacks of a plurality of other seats.

19. A method for utilizing a highly customizable control interface to a recliner comprising:
utilizing a touchscreen user interface comprising a touchscreen display:
displaying a menu on the touchscreen display with controls comprising the selection of a language in which an audio portion of audiovisual media will be heard at a headphone jack of a theater seat;
broadcasting menu selections via at least one of the internet and the intranet;
receiving audio information by multicast at the touchscreen user interface, the audio information containing a first range of frequencies corresponding to a plurality of different-language audio tracks for the audiovisual media;
utilizing headphones connected to the headphone jack to listen to an audio feed from the audiovisual media in the selected language; and
using a user recognition feature selected from the group consisting of a fingerprint recognition feature, a voice recognition feature, and a face recognition feature to recognize a user of the recliner.

20. The method as recited in claim 19, wherein the touchscreen user interface of one recliner is configured to control a language output of headphone jacks of a plurality of other recliners.

* * * * *